UNITED STATES PATENT OFFICE.

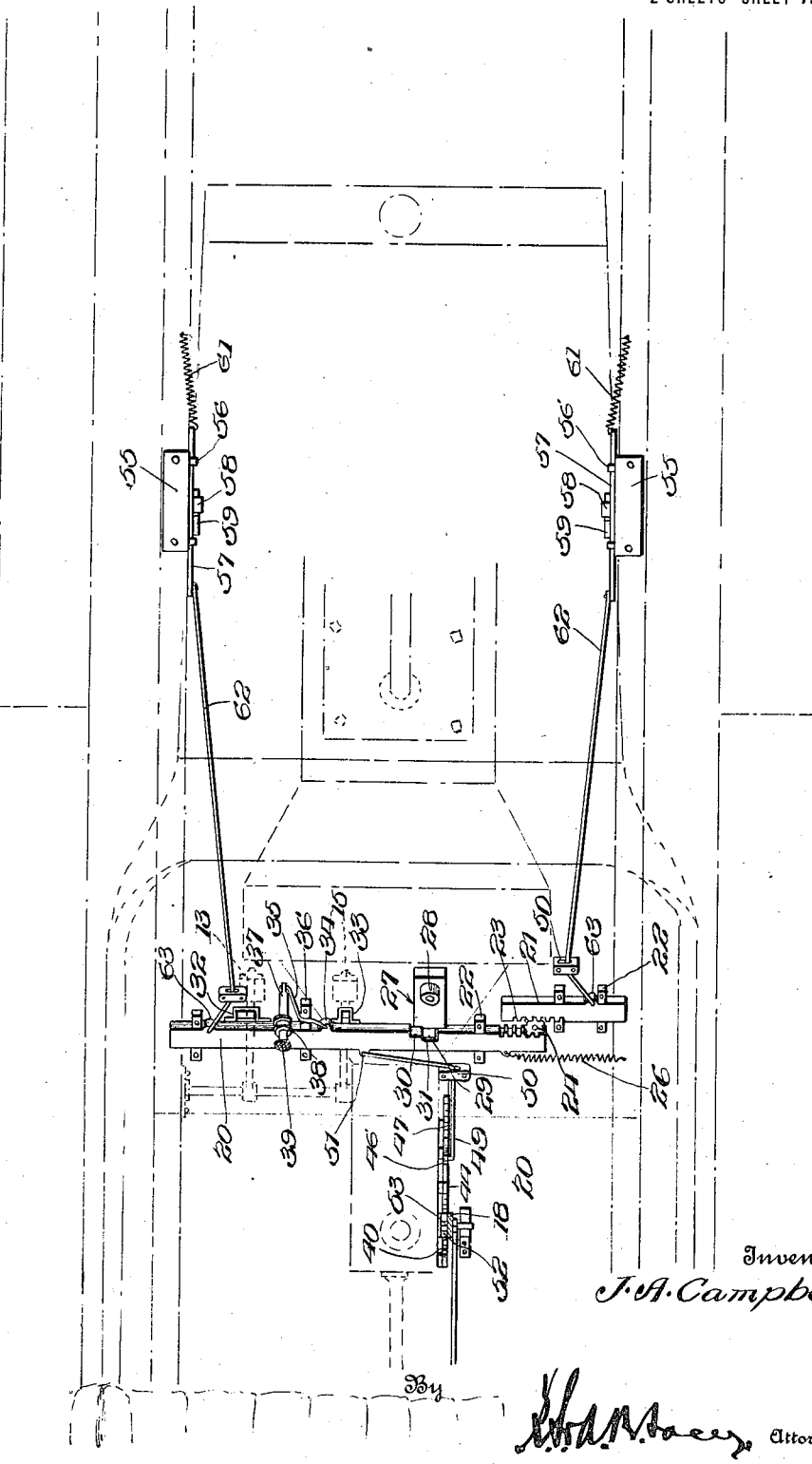

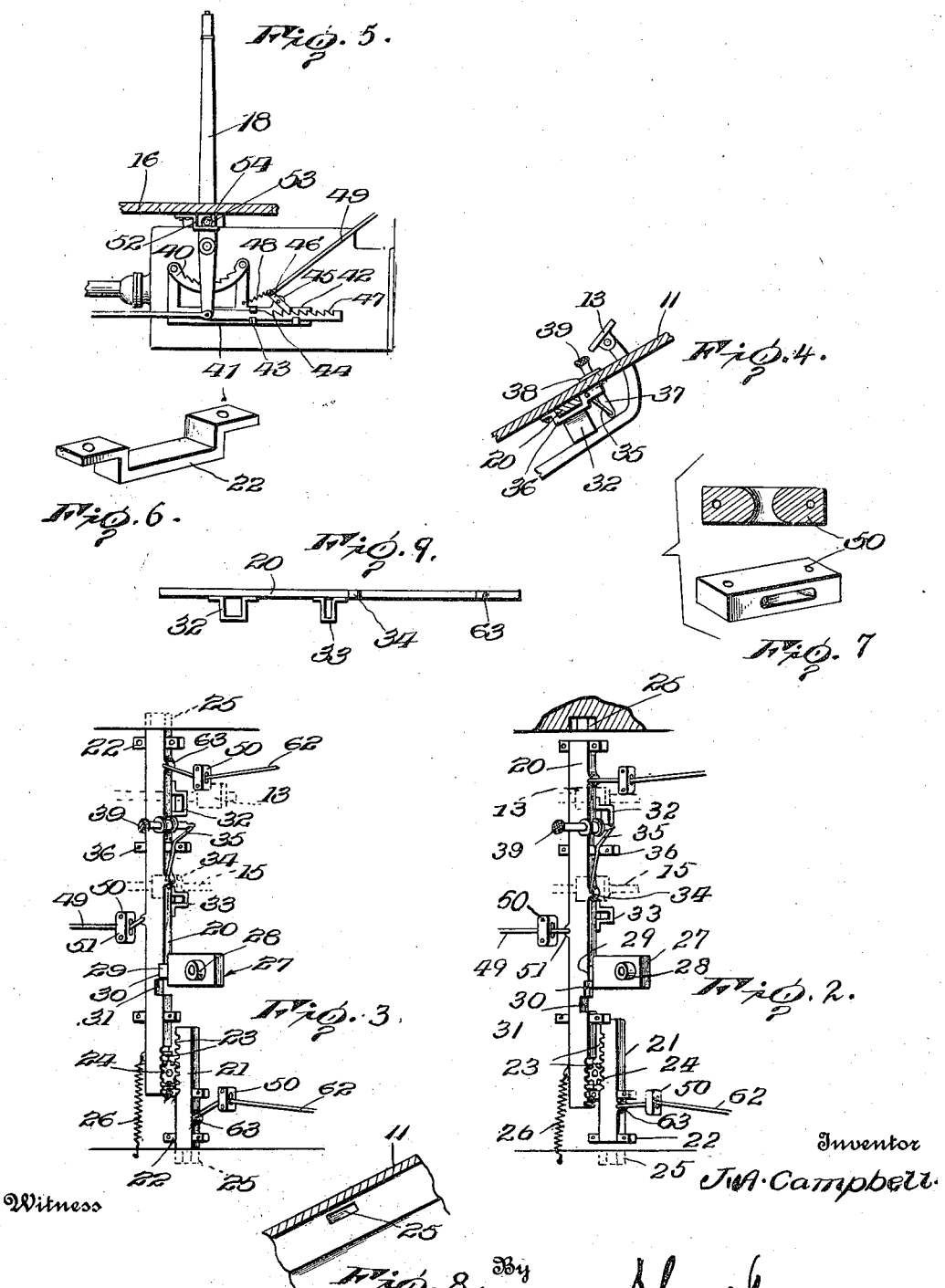

JOHN A. CAMPBELL, OF CARBONDALE, ILLINOIS.

AUTOMOBILE-LOCK.

1,275,126.

Specification of Letters Patent.

Patented Aug. 6, 1918.

Application filed April 26, 1917. Serial No. 164,775.

*To all whom it may concern:*

Be it known that I, JOHN A. CAMPBELL, a citizen of the United States, residing at Carbondale, in the county of Jackson and State of Illinois, have invented certain new and useful Improvements in Automobile-Locks, of which the following is a specification.

My invention relates to new and useful improvements in locking devices for self-propelled vehicles and has for its primary object the provision of a device which may be readily applied to automobiles of conventional design and which, while employing only a single key operated lock, may be manipulated to lock the clutch controlling member in inactive position and the brake controlling member in active position. Obviously, with these parts locked, all brakes on the vehicle will be applied and any transmission of power to the drive wheels will be prevented.

A further object which I have in view is the construction of a locking device of the above character, the major portion of which may be supported against the lower face of the toe boards of the vehicle where it will not be in the way and where it cannot mar the appearance of the vehicle.

Another object which I have in view is the provision of supplemental locking devices controlled by the main locking device for securing the toe boards and floor boards of the vehicle in place so as to prevent access to the locking device by removal of any of these parts.

With these and other objects in view, my invention will be more fully described, illustrated in the accompanying drawings, and then specifically pointed out in the claims which are attached to and form a part of this application.

In the drawings:

Figure 1 is a plan view of my invention, parts of the vehicle being shown in dotted lines;

Fig. 2 is a fragmentary plan view of my invention, showing it in inactive position, the parts being shown in active position in Fig. 1;

Fig. 3 is a view corresponding to Fig. 2, showing the position of the parts when the lock is partially applied;

Fig. 4 is a fragmentary sectional view, showing the lock actuating plunger and also showing the clutch pedal in locked position;

Fig. 5 is a fragmentary sectional view, showing the means employed in locking the emergency brake hand lever;

Fig. 6 is a perspective view of one of the lock supporting cleats;

Fig. 7 illustrates the type of cable guide employed;

Fig. 8 is a fragmentary sectional view, showing one of the locking bar receiving sockets;

Fig. 9 is an elevation of the main locking bar.

Corresponding and like parts are referred to in the following description and indicated in all the views of the drawings by the same reference characters.

In order to insure a clear and accurate understanding of my invention I have illustrated it in connection with a motor vehicle of conventional type having a toe board 11 slotted for passage of the shank of a clutch pedal 13 and for passage of the shank of a service brake pedal 15. The vehicle also has the usual floor board 16 slotted for passage of the emergency brake lever 18 which is pivotally supported beneath the floor boards.

My improved locking device includes a pair of locking bars 20 and 21 which are supported for sliding movement against the lower face of the toe board 11 by cleats 22, the construction of which is clearly shown in Fig. 6. These locking bars are mounted for movement transversely of the toe board and at their inner ends overlap each other in spaced relation, one locking bar being preferably of considerably greater length than the other. The opposed edges of the inner ends of the locking bars are provided with rack teeth 23 which mesh with an idler pinion 24 supported for rotation by the toe board so that movement of either locking bar 20 in either direction will cause reverse movement of the other locking bar. When the locking bars are moved outwardly to their full extent, their outer ends seat in sockets 25 formed in the inner faces of the frame of the vehicle and thus serve to lock the toe board against displacement. A helical spring 26 normally serves to draw the locking bar 20 and, consequently, the locking bar 21 inwardly. Disposed adjacent one edge of the locking bar 20 and secured against the lower face of the toe board is a key operated lock 27 of the pin or equivalent type, the key receiving plug 28 of which is projected through a suitable opening formed in the toe board so that it may be readily accessible to the owner. The locking bolt 29 of this lock 27 is adapted to seat either in a notch 30 formed in the adjacent edge of the locking bar 20 or in a communicating notch 31 which, however, is deeper than the notch 30. When the locking bars are moved outwardly to bring the notch 30 into alinement with the locking bolt 29, the ends of the locking bars will be just clear of the sockets 25, while further movement of the locking bar to bring the seat 31 into alinement with the locking bolt 29 will engage the ends of the locking bars in their seats 25.

A pair of abutments 32 and 33 are secured to the lower face of the locking bar 20 and project downwardly to such an extent that if the clutch and brake pedals are depressed and the locking bar 20 is moved outwardly to its full extent they will engage against the upper edges of the shanks of these pedals to hold the pedals in depressed position. It should be noted that the abutment 32 is of greater width than the shank of the pedal which it engages and is so arranged that it may be brought into engagement with the clutch pedal shank before the abutment 33 engages over the brake pedal shank and yet may still remain in engagement with the clutch pedal shank when the abutment 33 has been engaged by the brake pedal shank.

The locking bar 20 is formed in one edge with an eye 34 to which is secured one end of a cable 35 which is then passed through a guide 36 formed in the extension of one of the cleats 22 and is connected to the lower end of a plunger 37 which is reciprocally mounted in a sleeve 38 set into the toe board and which, at its upper end, is provided with a toe piece 39. The amount of movement of this plunger and the length of the cable 35 are so proportioned that when the locking bar 20 is in its innermost or inactive position under the pull of the spring 26, the plunger will be held in its most upwardly extended position and the cable will be tight, while when the plunger is depressed to its full extent, it will act through the cable to pull the locking bar 20 outwardly a sufficient distance to bring the seat 31 in alinement with the bolt 29.

The means employed for locking the emergency brake lever 18 in active position is best shown in Fig. 5 of the drawings. As there shown, the toothed segment 40, with which its latch operates, is supported by a bracket 41 having a forwardly extending arm 42 carrying guides 43 which support a slide 44 which has loose pivotal connection with the lower end of the brake lever 18. The arm 42, intermediate its length, has an upwardly directed pivot ear 45 upon which is pivoted a pawl 46 coöperating with ratchet teeth 47 formed in the upper edge of the slide 44. A spring 48 normally serves to hold the pawl 46 out of engagement with the teeth, while a cable 49, connected to the outer end of the pawl 46 and run through a cable guide 50, best shown in Fig. 9, is connected to an eye 51 formed upon the locking bar 20. This cable is so proportioned in length that upon movement of the locking bar 20 to its extreme outer or active position, the pawl 46 will be swung into engagement with the teeth 47 against the action of the spring 48 to hold the emergency brake lever 18 in whatever position it occupies. Consequently, if the emergency brake lever is drawn back to apply the brakes which it controls, prior to moving the locking bars to active position, the emergency brakes will be locked in place. A hook 52 secured to the lower face of the floor board has its bill portion extended in spaced relation thereto at a suitable point to engage beneath a roller 53 carried by a pin 54 projecting from the side of the brake lever 18 when the latter is drawn to such a position as to apply the brakes. Under these circumstances, it will be clear that until the brake lever is swung forwardly, which cannot be done until the locking bars 20 and 21 are released, the floor board cannot be raised.

As a means for locking the hood in place, I mount brackets 55 upon each of the side frame members of the vehicle and these brackets have guide lugs 56 which slidably support locking slides 57 having locking lugs 58 adapted to be engaged by the horizontally disposed arms of L-shaped latches 59 secured to the intermediate portions of the lower edges of the hood. Springs 61 normally serve to hold the locking slides in forward position and, consequently, out of engagement with the latches, while cables 62, which are secured to the rear ends of the slides, pass through suitable cable guides 50 and are secured to eyes 63 carried by the locking bars 20 and 21, act to draw the slides rearwardly to active position when the locking bars 20 and 21 are moved outwardly to locking position.

In describing the operation of my improved lock, I will assume that the parts are in inactive position, as shown in Fig. 2. Under these circumstances, when the driver of the vehicle wishes to lock it, he will apply the emergency brakes by swinging the brake lever 18 rearwardly. He will then hold the clutch pedal in depressed position with one foot and press upon the plunger 37 with his other foot, forcing both downwardly as far as possible. Under these circumstances, the locking bars 20 and 21 will be simultaneously moved outward until the abutment 32 has engaged over the shank of the clutch pedal 13 and until the abutment 33 has engaged against the side of the shank of the brake pedal 15. This operation merely locks the clutch pedal in inactive position. The operator will then depress the brake pedal 15 and again press upon the plunger to further move the locking bars 20 and 21 outwardly until, with the abutment 32 still holding the clutch pedal in depressed position, the abutment 33 has engaged over the upper edge of the shank of the brake pedal 15 when both pedals will be locked. Of course, it is assumed that as the locking bar 20 reached its first position the spring pressed locking bolt 29 sprang into engagement with the seat 30 to prevent return movement of the locking bars and that as soon as the locking bars reached the second named position, the bolt sprang further into engagement with the seat 31 to lock the bars against return movement.

The first position of the bars, after partial operation of the lock, is clearly shown in Fig. 3, while the fully locked position of the bars is shown in Fig. 1. When the locking bars are thus fully extended, their ends engage in the sockets 25 of the frame to secure the toe board in place, the emergency brake lever is locked against swinging movement, and in turn locks the floor board in place, and the locking slides 57 have been moved rearwardly to bring their lugs into engagement with the latches of the hood to lock the hood in place. Under these circumstances, all parts of the locking mechanism are rendered inaccessible as any unauthorized person trying to reach them would be prevented from doing so as he could not move the toe board, floor board or hood to get at any of the parts. Furthermore, as all the brakes are applied and locked and inasmuch as the clutch is locked in inactive position, it will be impossible to either start the vehicle, under its own power, or to tow it. As soon, however, as the owner turns the key in the lock 27 to retract the locking bolt 29, the spring 26 will return the locking bars to their innermost position, releasing the brake and clutch pedals and toe board and permitting the springs 61 and 48 to release the hood and emergency brake lever so that the emergency brake lever may be swung to inactive position to release the vehicle and also the floor board.

Although I have illustrated and described my invention in all its details of construction, it will of course be understood that I do not limit myself to such details, but reserve the right to make any changes, within the scope of the appended claims, without in the slightest degree departing from the spirit of my invention.

Having thus described the invention, what is claimed as new is:

1. In a locking device for motor vehicles, the combination with a removable toe board, and service brake and clutch pedals having their shanks movable through slots in the board, of means mounted upon the underside of the board adapted in active position to engage both pedal shanks to hold the pedals in depressed position and to also lock the board against removal.

2. In a locking device for motor vehicles, the combination with a removable toe board, and service brake and clutch pedals having their shanks movable through slots in the board, of means mounted upon the underside of the board adapted in active position to engage both pedal shanks to hold the pedals in depressed position and to also lock the board against removal, said means including locking bars mounted for sliding movement upon the board and adapted in active position to engage at their ends in sockets formed in the frame of the vehicle to lock the board in place, abutments formed upon one of the locking bars to engage over the shanks of the pedals when they are depressed, means for moving the locking bars to active position, and a key controlled lock for automatically securing the bars in active position.

3. In a lock for motor vehicles, the combination with service brake and clutch pedals, of means for locking the pedals in depressed position, a spring normally holding such means in inactive position, and step by step means for bringing the locking means to active position.

4. In a lock for motor vehicles, the combination with service brake and clutch pedals, of means for locking the pedals in depressed position, a spring normally holding such means in inactive position, and step by step means for bringing the locking means to active position, said step by step means operating to first lock one pedal and then lock the other, the first pedal still remaining locked.

5. In a lock for motor vehicles, the combination with a service brake pedal and a clutch pedal, of means for locking the pedals in depressed position, means operable after depression of one of the pedals for bringing the locking means to semi-active position to lock such pedal and operable after depression of the other pedal for bringing the locking means to active position to lock both pedals, and means for automatically and successively securing the locking means in its semi-active and active positions.

6. In a lock for motor vehicles, the combination with a clutch controlling member, and a brake-controlling member of a locking bar movable into active position to hold the clutch released and the brakes applied, means for holding said locking bar normally in inactive position, a plunger operatively connected with said locking bar to move the same to active position, and key-controlled means for securing the locking bar in active position.

In testimony whereof I affix my signature.

JOHN A. CAMPBELL. [L. S.]